May 17, 1949.  A. G. THOMAS  2,470,535
CALCULATING MACHINE
Filed Sept. 3, 1946  9 Sheets-Sheet 3
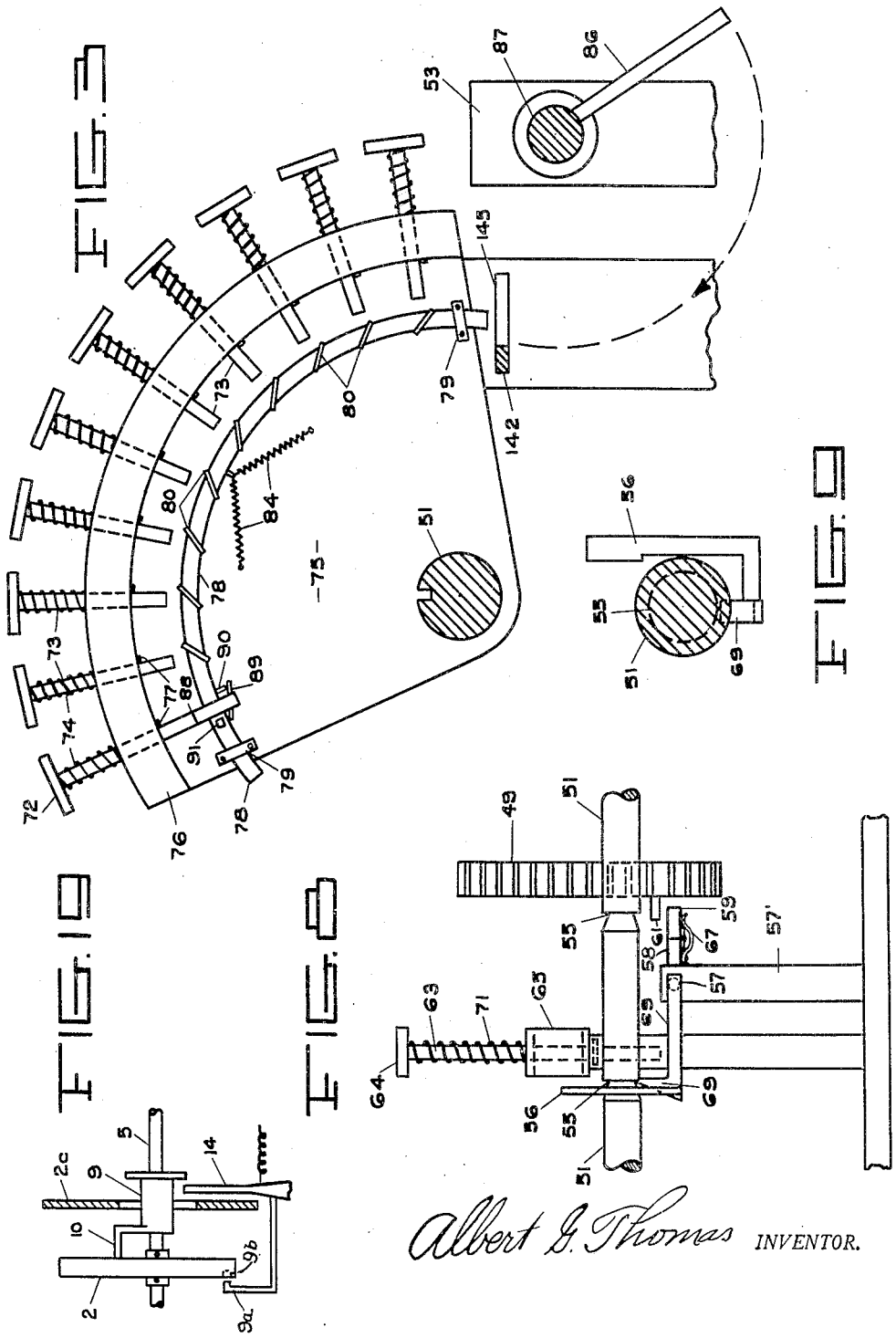
Albert G. Thomas INVENTOR.

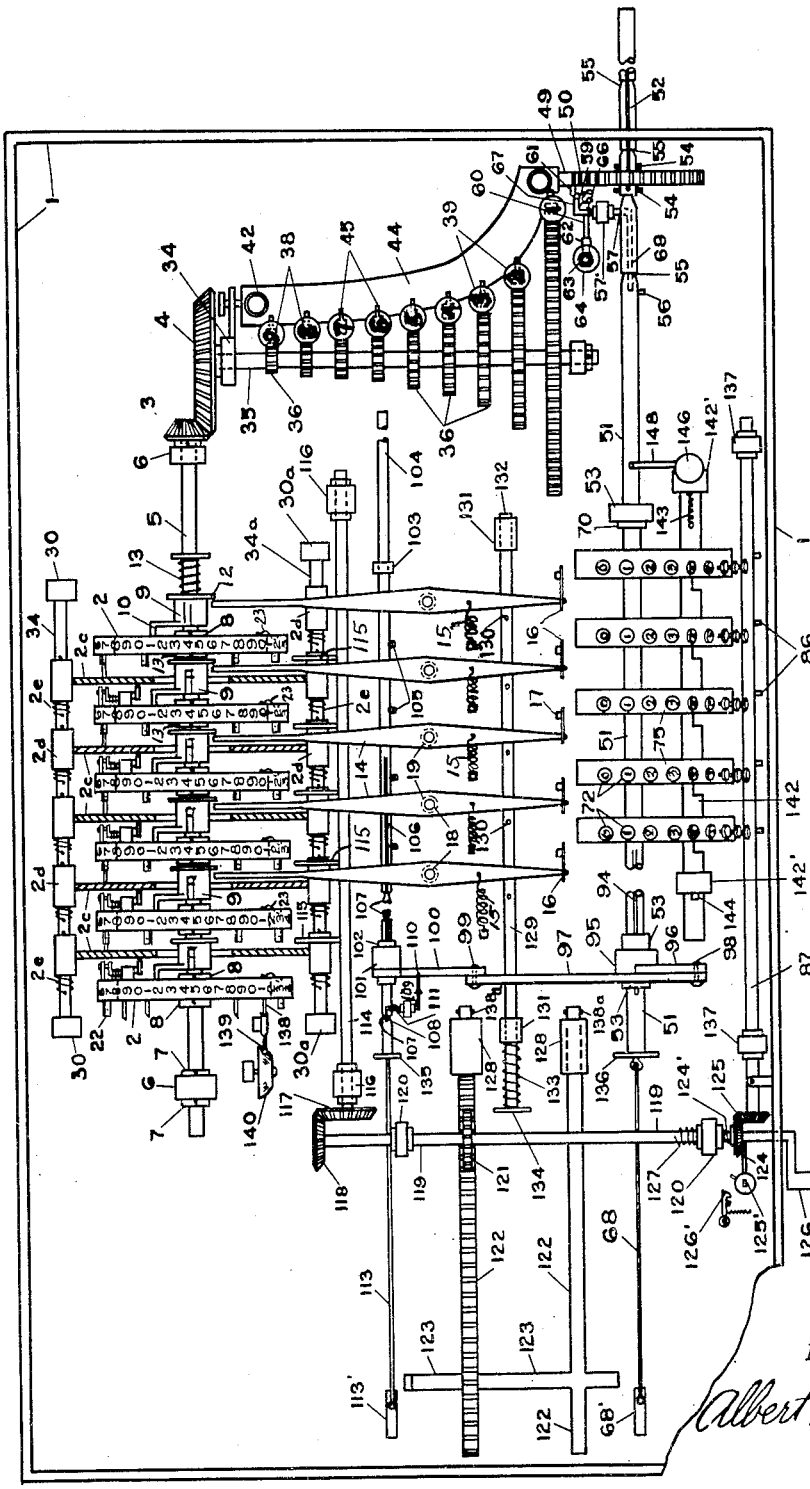

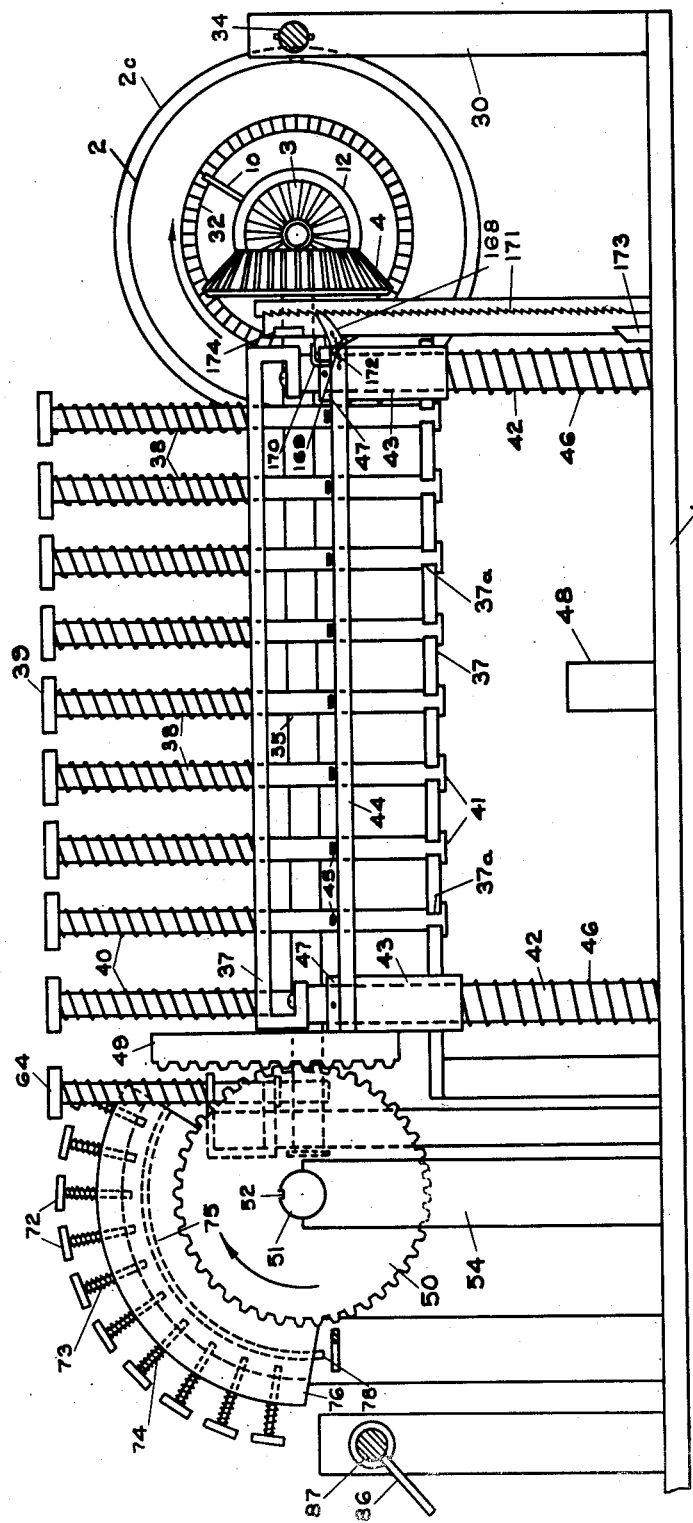

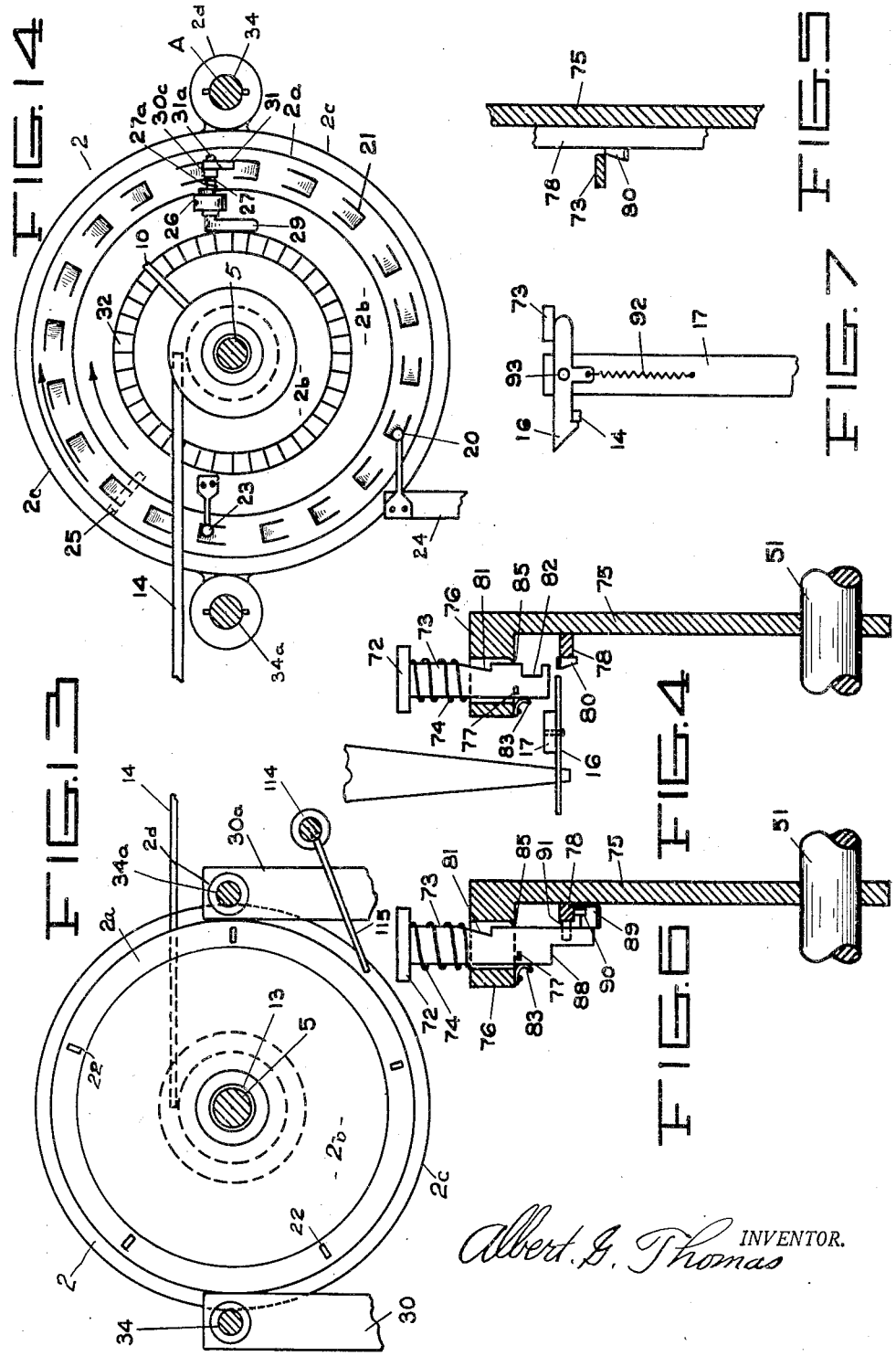

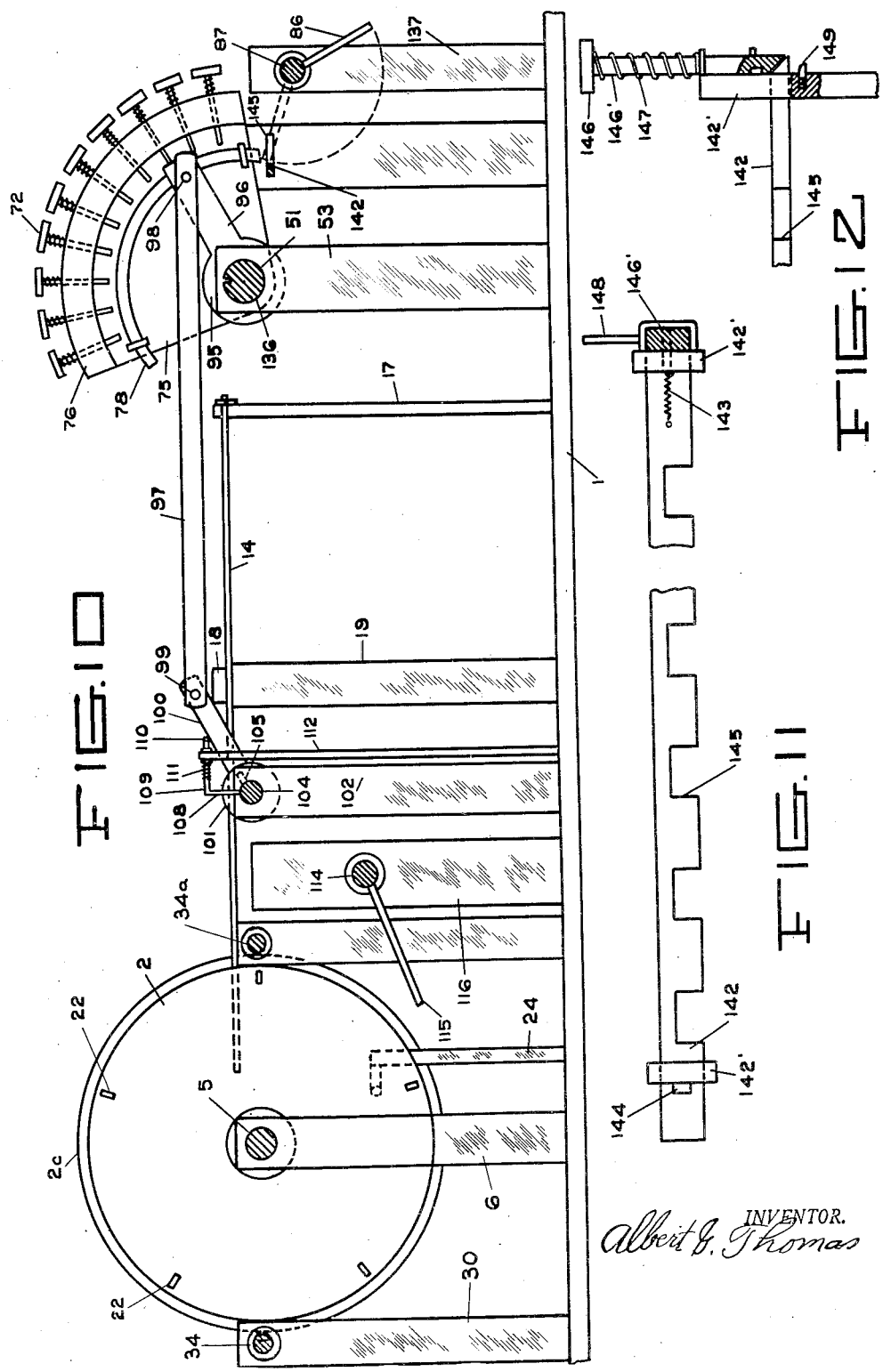

May 17, 1949.　　　A. G. THOMAS　　　2,470,535
CALCULATING MACHINE
Filed Sept. 3, 1946　　　　　　　　　　9 Sheets-Sheet 6
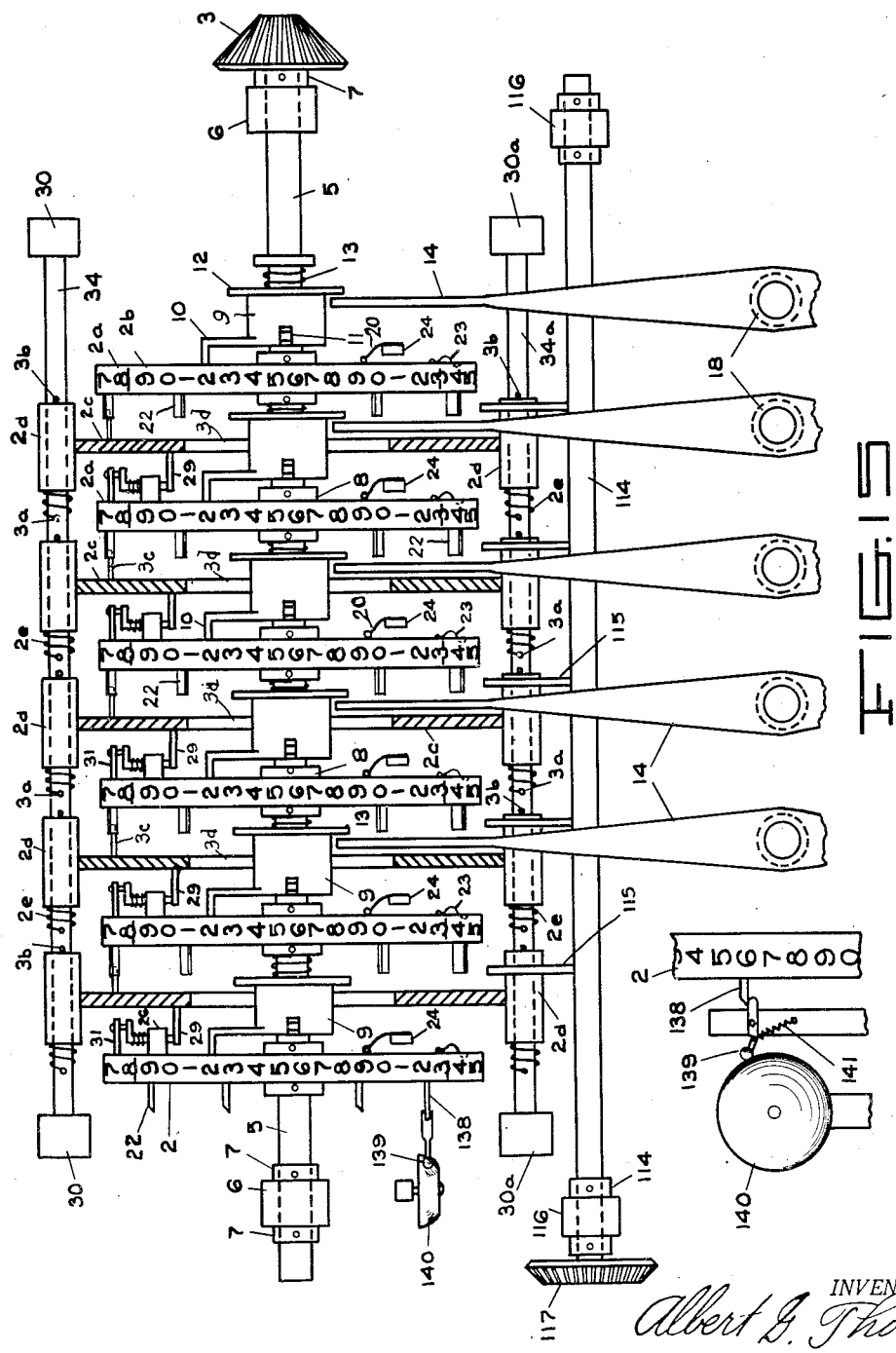
INVENTOR.
Albert G. Thomas INVENTOR.
Albert G. Thomas Albert G. Thomas INVENTOR.

May 17, 1949.  A. G. THOMAS  2,470,535
CALCULATING MACHINE

Filed Sept. 3, 1946  9 Sheets-Sheet 9

INVENTOR.
Albert G. Thomas

Patented May 17, 1949

2,470,535

UNITED STATES PATENT OFFICE 2,470,535

CALCULATING MACHINE

Albert G. Thomas, Lynchburg, Va.

Application September 3, 1946, Serial No. 694,627

16 Claims. (Cl. 235—61)

This invention relates to calculating machines.

It is an object of the invention to provide a machine of great simplicity and speed of operation, eliminating the repeated turning of handles and depressing of keys that has hitherto been necessary in many types of calculators.

Another object is to provide a calculating machine which requires, for multiplication for instance, the pressing of the desired keys representing the multiplier and multiplicand only one time in order to obtain the desired result. When these keys have been depressed, it is then necessary to pull the clearing lever only one time to clear the machine in preparation for another calculation.

A further object of the invention is to provide a machine which can be used not only as an adding machine, but also as a multiplying machine.

Another object is to provide an electrically operated calculator utilizing a step motor construction.

Other objects and advantages of the invention will appear from the following description taken in connection with the accompanying drawings, which illustrate by way of example a preferred embodiment of the invention, but which are not to be taken as a definition of the limits thereof, reference being had to the appended claims for that purpose.

In the drawings:

Fig. 1 is a top plan view of the calculating mechanism of the present invention.

Fig. 2 is an end elevation thereof of an enlarged scale, viewed from the right of Fig. 1, and showing in some detail the multiplier keys and associated mechanism.

Fig. 3 is a side elevation of the multiplicand keys and supporting sector.

Fig. 4 is a sectional view of the sector of Fig. 3.

Fig. 5 is a fragmentary edge view or detail of the release mechanism for the multiplicand keys.

Fig. 6 is a view similar to Fig. 4, but illustrating in detail the construction of the zero multiplicand keys.

Fig. 7 is a front elevation of the trigger release.

Fig. 8 is a front elevation of the zero multiplier key and carriage shaft release.

Fig. 9 is a fragmentary elevation, viewed from the left of Fig. 8, and of the catch or trigger of said figure.

Fig. 10 is a left end elevation, partly in section, of the device of Fig. 1, showing the link connection between the carriage shaft and an associated shaft.

Figs. 11 and 12 are, respectively, a top plan view and a side elevation of special adding mechanism with which the machine may be equipped.

Figs. 13 and 14 are, respectively, left and right hand elevations showing the two faces of the numeral wheels.

Fig. 15 is an enlarged fragmentary top plan view of the numeral wheels and their cooperating mechanism shown in the upper part of Fig. 1.

Fig. 16 is a fragmentary side elevation of the audible signal and actuating device therefor, of Figs. 1 and 15.

Fig. 19 is a fragmentary top plan view of a numeral wheel and locking mechanism.

Figure 17:
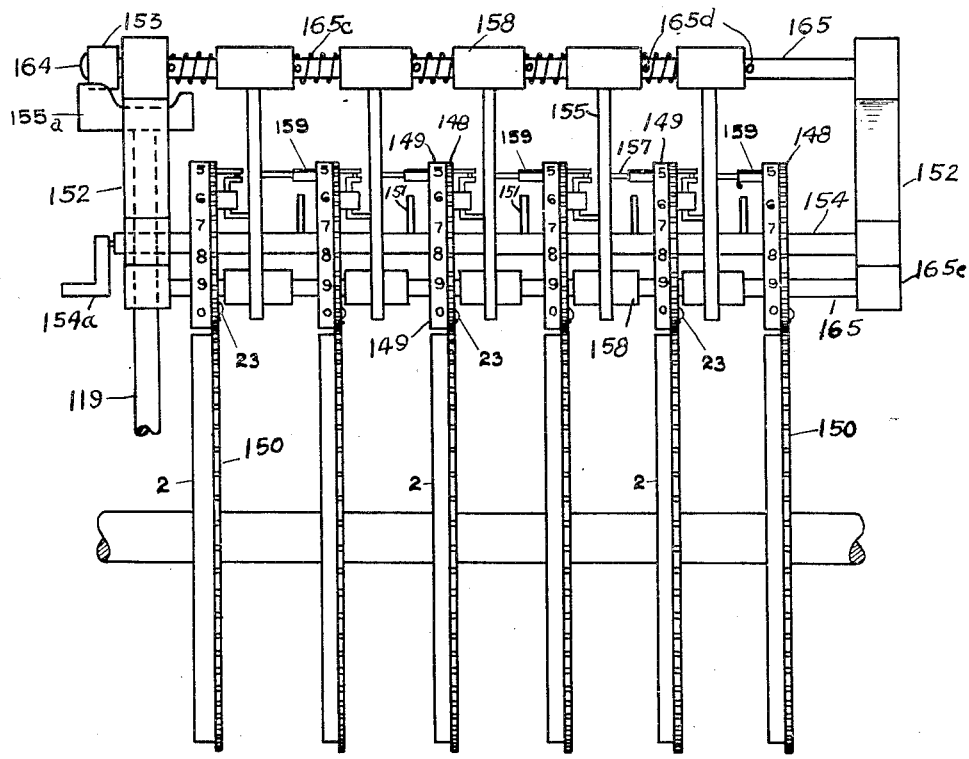
Figs. 17 and 18 are, respectively, a top plan view and side elevation of an extra adding mechanism, with which the machine may be equipped for the purpose, for example, of adding the results of any desired number of multiplications, such as the items of an invoice.

Referring in detail to the accompanying drawings, and particularly to Fig. 1, within the casing 1 is a wheel shaft 5 rotatably mounted in horizontally aligned bearings 6 and carrying a plurality of spaced apart numeral wheels 2, which are rotatable with respect to the shaft 5. The shaft 5 is provided at one end with a bevel gear 4, fixed on a horizontal shaft 35 and hereinafter more fully described. Collars 7 fixed on shaft 5 serve to keep the shaft from moving axially with respect to its bearings 6, and collars 8, located on shaft 5 between each two adjacent numeral wheels, keep said wheels at all times spaced a fixed distance apart.

The final result of any calculation is read on numeral wheels 2, rotatably mounted on shaft 5, each of which carries around its circumference a plurality of identical series of digits, each series running consecutively from 0 to 9. The number of series is determined by the selected diameter of numeral wheels 2 and the ratio of the driving gears 3 and 4. Where the ratio of gear 4 to gear 3 is 1:1, the numeral wheels 2 carry nine series of ten numbers each (considering 0 a number), running from 1 to 0, since no multiplication of any two single digits can exceed 9 × 9 or 81.

In the present embodiment of the invention, the driving ratio of gear 4 to gear 3 is 2:1, and each of the numeral wheels 2, therefore, carries five series of numbers each series running from 1 to 0. In this case, for a maximum multiplication, the wheels 2 will rotate nearly through two revolutions. By providing on each wheel a plurality of identical series of numbers, the required speed of their rotation is decreased, so that when the numeral wheels are released, as hereinafter described, the effect of their momentum is minimized. The numeral wheels 2, of course, may be provided with any usual or desired type of cover, provided with aligned openings or windows, and showing only one number of each wheel at a time.

The shaft 5 is provided with a plurality of clutches 9, located between the numeral wheels 2 and axially slidable on shaft 5. Each clutch 9 is provided with a groove in its bearing for the reception of a pin 11 fixed in shaft 5, this construction insuring that the clutches 9 will rotate with shaft 5 although they are axially slidable thereto. (See Figure 15.)

A coil compression spring 13 bears against each left collar 8 and against each clutch face, urging it toward the left, as viewed in Fig. 1, for the purpose of causing a narrow extension finger 10 on each clutch to engage the ratchet notches 32 provided in the adjacent face of each numeral wheel 2 (Fig. 2), so that when shaft 5 is rotated, the numeral wheels 2 will normally be rotated.

A plurality of aligned vertically extending bearing posts 19 are provided in the casing, and each carries pivotally at its top a horizontal lever 14, secured to its post by a bolt 18. To the long arm of each lever is attached one end of a coil spring 15 the other end of which is attached to a fixed pin secured to the framework of the machine.

Each arm 14 (see also Figs. 4 and 7) is held in the position of Fig. 1 against the action of its coil spring 15 by a catch or trigger arm 16, pivoted at 93 to a vertical post 17. Each catch or trigger arm 16 is held in the position of Fig. 7 by a coil spring 92 whose upper end is attached to the central depending portion of the arm 16, and whose lower end is fixed to post 17, the result being that each trigger arm 16 tends normally to occupy a horizontal position. If, however, the right hand end of any trigger arm 16 is struck downwardly, the left hand end (as viewed in Fig. 7) will rise and thereby release arm 14, whose spring 15 will pull it against the flange 12 of the corresponding clutch 9, moving it to the right as viewed in Fig. 1, and thereby disengaging finger 10 from its associated ratchet notches and thus releasing that numeral wheel 2 from driving engagement with shaft 5. In this position of parts the released numeral 2 will not rotate if shaft 5 is rotated, but will be held stationary by detent or spring strip 20 (see Figs. 14 and 15) bearing against the ratchet notches 21 cut into the face of the annular part 2a of numeral wheel 2. (See Fig. 14.) The notches 21 preferably correspond in number and location to the numbered divisions on the wheel periphery and already described. Detent 20 is supported on frame part or post 24. As shown in Fig. 19, fingers 9a may be attached to arms 14 to engage suitably aligned notches 9b in the left faces of numeral wheels 2, when clutches 9 are forced to the right. Over-travel can be prevented in this way.

Each wheel 2 comprises an inner disc portion 2b with central bearing hole for rotation on shaft 5, and an outer annular portion 2a rotatable on the periphery of portion 2b. Concentric face notches 32 are provided in portion 2b and notches 21 are provided in a face of portion 2a. The notches 21 are preferably equal in number to notches 32 and are equally spaced circumferentially so that the notches may be brought into radial alignment by means of cooperating detents 20 and 23 fastened to post 24 and wheel portion 2b, respectively. Detent 23 and notches 21 serve to align the two portions of the wheel 2, and detent 20 and notches 21 serve to align the outer numbered portion 2a with respect to suitable windows in the cover of the machine. These detents are displaced radially so that they will not collide when portion 2b is rotated on shaft 5.

In order to prevent the wheel portions 2a from slipping off the associated portions 2b, the latter may be provided with peripheral or circumferential grooves into which pins 25 fastened or screwed to portions 2a, project so that annular portions 2a are freely rotatable on central portion 2b, except for the detents. The pins 25 prevent axial relative movement of the wheel portions but allow relative rotary movement.

Bearing post 26 (Fig. 14) is fastened to wheel portion 2b and carries shaft 27 having integral arm 29 normally inclined to the plane of wheel 2, as indicated in Figure 15. The other end of shaft 27 has attached arm 30c normally projecting away from the right face of wheel portion 2a at an angle which may be substantially ninety degrees. Pawl 31 is pivoted at 31a to arm 30c adjacent its end and is adapted to engage notches 21 to cause rotation of wheel portion 2a relative to portion 2b when the free end of arm 29 is pushed toward wheel portion 2b. Coiled spring 27a is fastened around shaft 27 and is connected to this shaft and to bearing post 26 so that arm 29 is normally held in the position shown, a suitable stop being provided. Pawl 31 is urged against the face of wheel portion 2a by means of a suitable spring attached to the pawl and to arm 30c. All wheels 2 except the first one at the right (Fig. 1) are of the composite construction described. That wheel need not be in two parts since carry-over does not affect this wheel. It should, however, have pins 22 on its left face.

The remainder of the carry-over mechanism (Figs. 1 and 15) includes parallel rods 34 and 34a mounted in fixed posts 30 and 30a respectively. Discs 2c are attached at diametrically opposite points to sleeves 2d which are slidable on rods 34 and 34a. Compression springs 2e surround the rods and have their left ends held against axial movement by pins 3a in the rods. These springs urge sleeves 2d, and accordingly discs 2c, toward the right so that the sleeves normally abut stop pins 3b in the rods. Each disc 2c has a cam 3c attached to the right face thereof and positioned to be struck by the cam pins 22 of an associated wheel 2 as its outer rim 2a is revolved in clockwise direction as seen in Figure 14. The first wheel 2 can of course be of composite construction if desired but it is not necessary.

Discs 2c have central circular holes 3d large enough to allow rotation of pawls 10 without interference, and also to allow axial displacement of the discs without striking clutches 9. Pins or arms 22 are of cam shape or bevelled so that they force cams 3c and attached discs 2c to the left (Fig. 15) when they strike and pass cams. By properly proportioning the cams and associated lever arms and other parts any wheel rim 2a will be moved one number or notch forward with respect to its associated disc 26 whenever the numeral rim 2a of the wheel to the right (Figs. 1 and 15) has moved through ten numbered spaces; since at that moment a pin 22 of the latter wheel will strike the associated cam 3c and will force the attached disc 2c to the left the proper distance. This causes the adjacent arm 29 to be rotated with its shaft which in turn causes the pawl 31 to move the adjacent wheel element 2a one number higher. The horizontal or axial displacement of disc 2c will move arm 29 through the same angle regardless of the angular position of that arm about shaft 5. It is obvious that carry-over will be effected in the same way regardless of whether the wheel to the left of the actuating wheel is moving or stationary, since the movement of disc 2c is axial and since post 26 and pawl 31 are carried around by the central portion 2b of the wheel in question.

Although each clutch 9 is urged normally toward the left, Fig. 1, by coil spring 13, the above described clutch release occurs upon movement of trigger arms 16 by reason of the fact that each spring 15 acting on arm 14 is under sufficient tension to overcome the opposing effect of its corresponding coil spring 13.

No clutch need be provided for the wheel on the extreme left, Fig. 1, since the carry-over mechanism performs the necessary action.

This carry-over mechanism (see Fig. 15) includes a pin or arm 22, located preferably on each wheel 2 perpendicular to the left face thereof and in the same axial line as the zero of the wheel. There being five zeros on each wheel in the present example of the invention, there are, accordingly, five corresponding pins 22 for each wheel.

Referring to Fig. 2 and to the right-hand part of Fig. 1, the horizontal shaft 35, mounted to rotate in end bearings 34 and having fixed thereon bevel gear 4 meshing with bevel gear 3, has fixed at intervals therealong a series of gears 36, the diameters of which increase in geometrical ratio so that the largest gear has nine times as many teeth as the smallest. Since the ratio of bevel gear 4 to cooperating bevel gear 3 is 2:1, any angular rotation of shaft 35 will be accompanied by a rotation of shaft 5 through twice that angle.

Still referring to Fig. 2 and to the right-hand part of Fig. 1, with each gear 36 meshes a vertical rack bar 38, whose movement is limited to a fixed vertical path by guide slots cut in fixed plates 37 mounted on posts and in which the rack bars 38 are vertically movable. At the top of each rack 38 is fixed a numbered push button 39, each push button bearing one of a series of numbers running from 1 to 9, as shown in Fig. 1. These push buttons are the multiplier keys. The zero key will be hereinafter described.

The rack bars 38 are maintained normally in the raised position of Fig. 2 by coil springs 40, one spring encircling each rack bar. The upward movement of each rack bar is limited by a stop lug 41 provided on the bottom of each bar and striking against the bottom of the lower plate 37 at the upper limit of the rack bar movement. A projecting lug 45, fixed to each rack bar, overlies a portion of the curved plate 44 and is in close proximity thereto when its rack bar is in upper position, so that any depression of one of the rack bars 38 will, through its lug 45, cause a depression of curved plate 44, the ends of which are fixed to guide sleeves 43 vertically movable on fixed shafts 42 and maintained in upper position by coil springs 46 surrounding shafts 42 and bearing at their lower ends against the bottom plate 1 of the machine, and at their upper ends against the bottoms of the guide sleeves 43. These springs 46 thus urge curved plate 44 against collars 47 fixed upon the upper ends of stationary guide shafts 42 until one of the keys 39 is depressed. Upon depression of one of these keys, the key lug 45 forces curved plate 44 downward until it strikes a fixed lower limit stop 48. Lugs 45 are sufficiently small to pass through the slots 37a in the lower plate 37. When the key 39 is released, its spring 40 returns it to initial position, and springs 46, acting on guide sleeves 43, return plate 44 to initial or upper position. Each rack bar 38 has the same length of travel and each bar has the same number of rack teeth.

The invention provides mechanism to insure that each multiplier key 39 will be depressed through its full stroke. Referring to Fig. 2, at the right-hand edge of plate 44, a pawl 168 is attached by a hinge pin 169, and a coil compression spring 172 has one end fastened to the plate 44 and its other end fastened to the pawl 168. The spring 172 is fastened on the edge faces of the plate and pawl beyond the end of the hinge pin 169, so that if the pawl is raised, the intermediate portion of the spring moves above the level of the hinge pin and tends to hold the pawl in raised position. If the pawl is depressed, the intermediate portion of the spring 172 passes below the level of the hinge pin 169 and maintains the pawl in lowered position. A stop pin 170, fixed to curved plate 44, limits the upward movement of the pawl 168, and its lower movement is limited by contact with the right-hand edge face of curved plate 44. An upper pawl-shifting stop 174 is fixed to the framework of the machine and is struck by the pawl 168 as the pawl nears its upper limit of travel and forces the pawl into lower position so that it will be urged against the teeth of a fixed vertical rack 171 and slide over these teeth as the plate 44 moves downwardly, the teeth of the fixed rack 171 preventing any upward movement of the pawl 168 and plate 44 until the pawl nears its lower limit of travel, where it strikes the lower pawl-shifting pin 173 fixed to the base of the machine, which prevents the pawl from moving downwardly any further, so that further downward movement of the plate 44 to the lower limit of its travel will effect the shifting of pawl 168 upwardly about its hinge pin so that the coil spring 172 will hold it in raised position out of contact with the teeth on fixed vertical rack 171 so that plate 44 can return freely to its upper position under the influence of coil springs 46. This mechanism insures that any multiplier key 39 must be depressed its full predetermined distance, and thereby effect a predetermined rotation of shaft 35 and predetermined depression of plate 44 and also a predetermined rotation of multiplicand keys 72, hereinafter described, before the plate 44 returns to its upper position. The teeth on rack bars 38 are so located, however, that the rack bars have to be depressed an appreciable distance before their teeth engage the teeth of their respective gears 36. At the left-hand end of curved plate 44 (Fig. 2) is fixed a vertical rack 49, the teeth of which mesh with the teeth of a cooperating gear 50 mounted on shaft 51, which is supported by spaced-apart fixed bearings 53. A fixed guide fork 54 extends upwardly from the base of the machine and embraces the gear 50 for the purpose of preventing axial movement thereof when shaft 51 is moved axially to the right or left, as hereinafter described. The fork 54 also serves as a fixed support for shaft 51, to which the gear 50 is connected to rotate therewith, but to permit axial movement of the shaft with respect to the gear, for which purpose the gear 50 is feathered to shaft 51 by means of a guide lug in the gear entering an axial keyway 52 in the shaft. By this means, any rotation of gear 50 will be transmitted to shaft 51 regardless of the position of shaft 51 axially with respect to the gear 50.

As shown in Figs. 1 and 8 a plurality of circular beveled grooves 55 are cut around shaft 51 and are spaced apart a distance equal to the distance between trigger fingers 16, already described. The number of grooves 55 should be the same as the maximum number of digits permissible in the multiplier, not to exceed the capacity of the machine. Preferably the number containing the smaller number of digits is chosen as the multiplier since the distance through which shaft 51 must be shifted, as hereinafter described, and also the number of grooves 55, will then be the minimum. In the present example of the invention three grooves 55 are shown (Fig. 1). The rack 49 always causes shaft 51 to rotate through less than one-half a complete turn, so that since there is only one keyway groove 52 in said shaft, the keyway never moves far enough to interfere with any of the mechanism cooperating with beveled grooves 55.

The shaft 51 is continually urged to move toward the left (Fig. 1) by a spiral tape spring 68 attached to the left-hand end of shaft 51 and coiling in the fixed tape spring housing 68', and the shaft 51 is released for movement to the left (Fig. 1) by the following mechanism. A fixed bearing 57' extends upwardly from the base of the machine adjacent gear 50 (Figs. 1, 8 and 9) and rotatably supports a trigger shaft 57 fixed axially with respect to said bearing by a pair of spaced apart collars on said trigger shaft. This trigger shaft has fixed thereto at one end the horizontally projecting trigger release arm 69, which extends axially under shaft 51 (Figs. 1 and 9) and is normally pressed against the under surface of shaft 51 by a coil spring 66 surrounding the trigger shaft and having one end fixed in the trigger shaft and the other end fixed to bearing 57' and tending to rotate the trigger shaft in the proper direction to cause the trigger arm 69 to bear against the under surface of shaft 51. To the other end of trigger shaft 57 a pair of oppositely extending arms 58 and 60 are attached. The arm 58 has hinged to its outer end a movable extension 59 urged by a spring to occupy normally the position shown in Fig. 8 and lying below a lug 61 fixed to and projecting from the vertially moving rack 49. The construction is such that downward movement of lug 61 will cause the extension 59 to move out of its path, but when the lug 61 is below extension 59 and moves upwardly into contact with it, it will communicate its upward movement to the extension 59 and cause rotation of the trigger shaft 57, lowering trigger arm 69, thereby disengaging it from a notch 55 in shaft 51 and permitting shaft 51 to move to the left under the influence of the tape spring 68.

The arm 60 is struck by the zero key, hereinafter to be described. To the side of trigger arm 69 is fastened a stop 56 (Figs. 8 and 9) designed to stop movement of the shaft 51 towards the left after a short displacement upon disengagement of trigger arm 69 from the notch 55. The stop 56 thus prevents shaft 51 from moving to the left through too great a displacement before trigger arm 69 is released by upward movement of lug 61 to come into contact again with the under side of shaft 51 and thus to engage the next approaching notch 55. When the trigger arm 69 has been so released and again presses upwardly against shaft 51 under the action of spring 66, the stop 56 rises out of notch 55, into which it has been drawn by downward movement of trigger arm 69, and allows the shaft 51 to move to the left until trigger arm 69 engages in the next approaching notch 55. In practice, the shaft 51 extends beyond gear 50 a distance equal to the maximum necessary displacement of the shaft 51. Movement of shaft 51 toward the right is limited by a stop collar 70 fixed to shaft 51 and abutting against right-hand bearing 53 to limit movement of the shaft 51 towards the right.

The lug 61 on rack 49 is so located that it causes the release of trigger arm 69 from shaft notch 55 to permit the carriage shaft 51 to shift to the left only after sectors 75 on said shaft with their keys have been rotated nearly back to their original or starting position in order to prevent sectors 75 from striking against trigger levers 16 and thereby preventing proper shifting of the carriage.

It has already been stated that it is necessary to move multiplier keys 39 downward a certain distance before racks 38 mesh with gears 36 to rotate shaft 35. It is this distance or movement of the racks 38 without engaging gears 36 that makes possible the rotation of sectors 75 to clear trigger levers 16 when the carriage is shifted. When a multiplier key 39 is depressed and a rack 38 moves downwardly, carrying curved plate 44, the shaft 51 immediately begins its rotation, whereas shaft 35 does not begin to rotate until the instant the multiplicand zero keys 72 are in alignment or striking position relative to triggers 16. If the zero keys are allowed to remain depressed, the numeral wheels 2 will not turn even though shaft 5 be rotated due to the fact that clutches 9 will be disconnected from numeral wheels 2 by the release of levers 14, as hereinbefore described.

Referring now to the zero multiplier key 64, and particularly to Fig. 8 and Fig. 1, this key is mounted on the stem 63 guided in vertical movement by guide openings in U-shaped plates 65 fixed to a vertical post secured to and extending upwardly from the base 1 of the machine. The zero multiplier key 64 is urged constantly to its upper position by a coil return spring 71. Suitable stops are provided to limit the path of movement of the stem 63. Attached to stem 63 (Fig. 1) is a horizontally projecting lug 62 extending over arm 60, already referred to, and which is moved downwardly by lug 62 when the zero multiplier key is depressed. This movement causes downward motion of trigger arm 69 to release the carriage, as already described, so that the carriage shaft 51 is shifted one space to the left (Fig. 1) each time the zero multiplier key is depressed.

Referring now to the multiplicand keys, the keys 72 (Figs. 1, 3, 4 and 6) are mounted for radial reciprocating movement in flanges 76 of sectors 75, which are rigidly secured to shaft 51 and are axially spaced apart a distance equal to the distance between trigger arms 16. Referring particularly to Figs. 3 and 4, it will be noted that the rectangular key stems 73 work in slots provided in flanges 76, each key being normally urged to upper position by a coil spring 74, a stop lug 77 on each key limiting upward movement of the key by abutting against the under side of flange 76. On a face of each sector, guides 79 are provided for an arcuate strip 78, which can move a short distance in either direction about shaft 51 as an axis, the movement taking place with respect to the sector to which the strip 78 is attached.

Referring to Fig. 4, each key stem 73 is provided with a notch 81 formed in the inner edge of the stem, which notch is adapted to be engaged by the slightly projecting bottom edge 85 of the stem guide slot in flange 76, there being a sufficient play in the mounting of the key stem to permit an adequate movement to the right or left, as viewed in Fig. 4, for this purpose. Each stem 73 is urged toward the face of the sector 75 by a flat spring 83 pressing against the edge of the stem 73 opposite the notched edge thereof. Engagement of the forward edge 85 with the notch 81 will therefore occur if the key 72 is depressed, and the key will remain in its depressed position until the lower end of the stem is moved to the left to disengage the notch 81 from the edge 85, whereupon spring 74 returns the key to initial position.

Each stem is also provided with a cut-out notch 82 for cooperation with mechanism now to be described. To each circular strip 78 are fastened a plurality of inclined plates 80 (Figs. 3 and 4) which are inclined with respect to tangents to the circular strip, as shown in Fig. 3. The circular strip 78 is provided with a pin to which is attached one end of each of two coil springs 84, the other ends of these springs being fixed to sector 75 so that circular strip 78, if displaced in either direction, will return to its initial position. The inclined plates 80 normally lie below the bottom edges of the key stems 73 so that if any multiplicand key (other than the zero key) be depressed, the lower edge of its stem 73 will strike one of the inclined plates 80 and continued depression of the key will thereby move the circular strip 78 to the right, as viewed in Fig. 3. As the stem passes downward and notch 81 is engaged by projecting edge 85, notch 82 moves downwardly far enough to permit the cooperating inclined plate 80 to pass through it, thus permitting circular strip 78 to return to initial position under the influence of one of the springs 84. A clearing arm 86 (Fig. 3) is provided to rock about shaft axis 87 and can be turned to strike the end of arcuate strip 78. When the strip 78 is moved toward the left, as viewed in Fig. 3, by the clearing arm 86 striking against its end, the beveled edge (Fig. 4) of the plate 80, cooperating with the key that has been depressed, will strike the inner edge of notch 82 in stem 73 and will force said stem toward the left, as viewed in Fig. 4, against the action of flat spring 83, thus releasing the depressed key from engagement with projecting edge 85 and permitting it to return to its upper or initial position under the influence of spring 74, circular strip 78 resuming its initial position under the influence of spring 84 as soon as clearing arm 86 on shaft 87 is moved clear, that is, moved counterclockwise, as viewed in Fig. 3.

All the multiplicand keys except the zero keys are constructed as shown in Fig. 4. Fig. 5 shows details of construction.

The zero multiplicand keys are constructed as shown in Fig. 6, in which the key button 72, coil spring 74, notch 81, forward edge 85, stop 77, and flat spring 83 are all the same as the correspondingly numbered parts in Fig. 4. The right-hand lower portion of the zero key stem, however, is extended downwardly beyond the shoulder 88, which corresponds to the bottom of the stem of Fig. 4. Fastened to the bottom part of this downward extension is an inclined plane strip 89 (Figs. 6 and 3), and to the underside of strip 78 is secured the radially inwardly extending beveled lug 90. A horizontally extending wedge 91 projects from the adjacent side face of arcuate strip 78. Thus, whenever strip 78 is displaced toward the left, as viewed in Fig. 3, the lug 90 will strike inclined strip 89 and will thus move the zero key downwardly or towards depressed position until projection 85 engages notch 81. The zero key remains set after strip 78 is allowed to return to initial or neutral position, and is released only when another key is depressed, thereby forcing strip 78 to the right, so that wedge 91 strikes and releases zero key 72. Thus, every time the clearing arms 86 strike the ends of circular strips 78, all multiplicand keys except the zero keys are released, and all the zero keys are depressed and set in position to strike trigger 16 (see Fig. 4), already described. Also, any depressed zero key is released when any other multiplicand key on that sector is depressed.

Referring to Fig. 4, it will be evident that the multiplicand key stems will move past trigger arm 16 except when a multiplicand key is depressed. Upon rotation of shaft 51, any depressed multiplicand key 73 (Figs. 4 and 7) will strike against trigger arm 16, thereby releasing the cooperating arm 14 and consequently detaching clutch 9 from its cooperating numeral wheel, as already described. For convenience in construction and operation, the angle subtended by keys 72 is preferably slightly more than 90°.

Referring to Fig. 1, the left end of shaft 51 is provided with a keyway 94 for the reception of the key of a hub 95, which is rotatable with shaft 51 and is held against axial movement with said shaft by a forked bearing column 53 similar to the column 54, but surrounding the shaft in this case. An arm 96 attached to hub 95 has pivoted to its outer end a link 97 (see also Fig. 10). The other end of link 97 is pivoted to the outer end of an arm 100 fixed to hub 101 and keyed to the groove 106 of horizontal shaft 104, which is supported at one end in a bearing 103 and at its other end in a forked bearing 102 similar to the bearing 53, already described. Rotation of hub 101 will therefore rotate shaft 104, but without itself moving axially. A plurality of peripheral beveled grooves 107 are provided in shaft 104 similar to the grooves 55, already described and provided in shaft 51. The grooves 107 are spaced apart a distance equal to the distance between any two adjacent arms 14, which is the same as the distance between trigger arms 16. The number of grooves 107 is the same as the number of grooves 55. A spiral spring 113 in a housing 113' tends to move the shaft 104 towards the left and corresponds to the spring 68 attached to shaft 51. The finger 108 of trigger shaft 109 is urged into groove 107 by a spring 111 encircling said shaft and having one end fastened thereto and the other end to the fixed bearing support 112.

The other end of the trigger shaft has attached thereto a finger 110 hinged, as shown in Fig. 1, and constructed similarly to finger 59, already described, but so that it is operative to release finger 108 from groove 107 only when struck by downward movement of arm 100 and being ineffective when struck by upward movement of said arm. The shaft 104 is released by finger 108 shortly before arm 100 and keys 72 have returned to their initial or starting position, for a reason that will appear hereinafter. A plurality of pins 105 are mounted on shaft 104 and correspond in number to the number of arms 14, except that the arm 14 on the extreme right of Fig. 1 does not require the pin 105. These pins serve the purpose of resetting arms 14 after each multiplier key is depressed, and due to the construction described, one less arm is reset each time a multiplier key is depressed. The reason for this is that the carriage, consisting of sectors 75 and keys 72, on shaft 51, is moved one space toward the left every time a multiplier key is depressed, and it is necessary to reset only those arms 14 which register with the sectors 75, and one less arm will register each time a multiplier key is depressed.

The pins 105 normally extend upward to the right as shown in Fig. 10, and in this position shaft 104 can slide to the left in its forked bearing 102 and post bearing 103 without affecting arms 14 since the pins are slightly below the arms. When shaft 104 is rotated counter-clockwise however, the pins 105 extend upwardly and will strike against cooperating lever arms 14 when finger 108 is released and the shaft 104 is moved axially toward the left, as viewed in Fig. 1, by tape spring 113, which is sufficiently strong to overcome the combined force exerted on arms 14 by the springs 15, already described. Upon striking arms 14 the pins 105 move said arms counterclockwise about pivots 18 so that the forward tip ends of arms 14 will strike the beveled forward ends of catches 16 (see Fig. 7) and will raise catches 16 against springs 92, with the result that arms 14 will be caught and held in initial operating position again. As the shaft 51, and consequently arm 100, nears the end of its return stroke the finger 108 is released by arm 100 when it strikes against hinged finger 110, already described, and immediately thereafter the pins 105 will strike against arms 14, with the result already stated. As the return stroke of arm 100 is completed, the pins 105 will be rotated back to their original positions as shown in Fig. 10 clear of arms 14, and thereupon spring 113 pulls shaft 104 one space to the left, in which position it is brought to a stop by finger 108 engaged in the next oncoming groove 107.

Referring now to the clearing mechanism, the horizontal shaft 114 is rotatably mounted in end bearings 116 and is held by suitable collars against axial movement. Fixed to the left-hand end of shaft 114, as viewed in Fig. 1, is a bevel gear 117, which meshes with a bevel gear 118 keyed on horizontal shaft 119, which is located at right angles to shaft 114 and is rotatably mounted in fixed bearings 120 and is held against axial movement by suitable thrust collars. Extending from shaft 114 at spaced intervals are downwardly extending arms 115, which ordinarily lie below the path of pins 22, already described and extending from the faces of the numeral wheel portions 2a. When shaft 114 is rotated to clear the machine, the arms 115 are moved upwardly to strike any of the pins 22 which lie in their several paths, with the result that these pins are aligned so that each numeral wheel will show a zero reading through the cover slot. The pins 22 on the extreme left numeral wheel of Fig. 1 are for clearing purposes only. All the arms 115 on shaft 114 are long enough to insure that rotation of shaft 114 will cause each arm 115 to strike a pin 22 on each numeral wheel, regardless of the position of any wheel.

Still referring to Fig. 1, a pair of parallel rectangular rods 122 are slidably mounted in fixed bearings 128 and are prevented from moving further to the left than shown in Fig. 1 by end abutment pins 138a. The two rods 122 are connected by a cross rod 123, which moves in a horizontal path and is adapted to strike against the enlarged end flanges 134, 135 and 136 of the shafts 129, 104 and 51, respectively, whenever clearing handle 126, provided on the end of shaft 119, is turned. The top surface of one of the rods 122 is provided with rack teeth which mesh with the teeth of a gear wheel 121 fixed to shaft 119 for the purpose of causing horizontal movement of the cross rod 123 when the clearing handle 126 is turned.

The shaft 129 is slidably mounted in bearings 131 and is constantly urged toward the left, as viewed in Fig. 1, by a coil compression spring 133 located between the left-hand bearing 131 and the end flange 134 of shaft 129. Movement of said shaft towards the left is limited by a right-hand end stop flange 132. A series of pins 130 fixed in shaft 129 extend vertically therefrom and normally lie in the position of Fig. 1, that is, clear of arms 14. Upon operation of the clearing handle 126, however, cross rod 123, coacting with flange 134, moves shaft 129 toward the right, as viewed in Fig. 1, so that each pin 130 strikes a corresponding arm 14 and moves it far enough to be caught and held by a trigger arm 16 (see also Fig. 7). Shaft 129 is keyed or feathered with respect to one or both of its bearings to prevent it from rotating about its own axis. Upon operation of the clearing handle 126 to move shaft 129, as just described, the cross rod 123 will also move shafts 104 and 51 to the right, as viewed in Fig. 1, to return them to their initial or starting positions, where they are held by their respective holding fingers 108 and 69, as already described.

Referring now to shaft 87 (Fig. 1), this shaft is mounted in end bearings 137 fixed to and extending upwardly from the bottom frame plate of the machine. The shaft 87 is provided at one end with a bevel gear 125 meshing with a bevel gear 124 keyed on the clearing lever shaft 119, so that when the clearing handle 126 is turned, the shaft 87 is rotated, thereby moving arms 86 on shaft 87 to strike the circular strips 78 (see also Fig. 3) and thereby clear all the multiplicand keys 72 except the zero keys, all of which latter are automatically reset in striking position in the manner already described.

As stated, the bevel gear 124 is keyed to shaft 119, and is movable axially thereof, being urged normally into mesh with bevel gear 125 by a coil spring 124'. A spring-pressed pawl 126' is adapted to engage one arm of a bell crank lever, turned by a handle 125', whose other arm is engageable with the bevel gear 124, and acts to hold it against the action of coil spring 124' out of mesh with bevel gear 125 when handle 125' is turned so that the spring pressed pawl retains the bell crank in turned position. Release of the pawl permits the gears to mesh, the bell crank being forced by gear 124 to the position of Fig. 1, under the influence of coil spring 124'. The mechanism here described is used to repeat settings of the multiplicand keys. If the shaft 87 is disconnected, operation of the clearing mechanism will not disturb the multiplicand key setting.

The movement of rectangular rods 122 toward the right is checked when cross rod 123 strikes against bearing posts 128, which serve as a stop for the entire clearing mechanism. The return movement, when clearing handle 126 is released, is effected by spiral spring 127, acting on shaft 119, and which tends normally to rotate the clearing handle shaft 119 in the proper direction to move the rectangular rods 122 as far to the left as possible by means of gear wheel 121 and its cooperating intermeshing rack on one of the rods 122. Movement of the rods 122 toward the left is checked by the stop pins 138a, already described.

It will be seen that by the foregoing construction that one turn of the clearing handle 126 clears the entire machine and also depresses all zero multiplicand keys.

Referring now to the extreme left-hand wheel 2 shown in Figs. 1 and 16, extending from the face of this wheel it carries the pins 22 and a plurality of lugs 138, which are located nearer the axis of said wheel than the pins 22 and one of which strikes the pivoted clapper 139 whenever this wheel makes a rotation of ten unit spaces. The clapper 139 strikes a gong 140 as soon as it is released by the lug 138, being pulled back to its returned position by a coil spring. In the present instance there are five lugs 138 spaced apart equal distances in the face of the numeral wheel member 2a. The operation of this warning signal informs the operator that further computation performed on the machine will exceed the limits for which the machine has been constructed.

Referring to the method of multiplying, it is merely necessary to depress the desired multiplicand keys 72 and thereupon depress the multiplier keys 39 in inverse order, whereupon the product sought appears at once through the slots in the cover plate overlying numeral wheel elements 2a. A single pull on the clearing lever 126 will clear the entire machine in the manner already described, so that it is at once ready for another calculation. Suppose, for example, it is required to perform the multiplication 478×57, the number "4" key will be pressed on the third sector 75 from the right, the number "7" key on the second sector from the right, and the number "8" key on the extreme right-hand sector. The number "7" multiplier key 39 will then be depressed and after that the number "5" multiplier key. The answer or product can thereupon immediately be read on numeral wheel elements 2a. It will be observed that no hand shifting of the carriage is necessary. The order of depressing the multiplier keys is inverted, that is, the units digit is depressed first, thereafter the tens digit, etc., in order to eliminate the additional number of numeral wheels 2 that would be required were the order reversed and the units digit depressed last.

The following mechanism enables the machine to be used for adding. Referring to Figs. 1, 11, and 12, the flat bar 142 is slidably mounted in supports 142', and is constantly urged toward the right, Fig. 11, by a coil spring 143, which movement is limited by a stop pin 144 on bar 142. The plurality of notches 145 cut in bar 142 allow arms 86 (Fig. 1) to operate freely and also allow sectors 75 and strips 78 to return to their initial positions. When flat bar 142 is moved to the left, however, the unnotched portions of the bar will lie in the path of returning strips 78; consequently these strips will strike against the bar 142 and all multiplicand keys will be re-set at zero when they return to their initial positions.

The flat bar 142 is moved to the left (Figs. 11 and 12) by depression of a vertically reciprocable adding key 146, whose lower beveled end pushes the beveled end of the bar 142 to the left, and whose shank 146' is encircled by a coil spring 147, which urges the key normally to the position of Fig. 12.

A projection 148 extends horizontally from the key shank and has its outer end overlying a notch in shaft 51. When the adding key is depressed, the projection 148 enters this notch and thereby prevents shaft 51 from moving to the left when the number "1" multiplier key is depressed for addition. A spring detent 149 enters a depression in the key stem to old it down until it is intentionally pulled up to non-adding position. Loop guides secured to post 142' insures uniform vertical rectilinear motion of the guide key.

To add, then, it is necessary merely to depress the adding key 146, and thereafter, for each number to be added, depress the desired multiplicand keys and, after each such depression, the number "1" multiplier key. The clearing handle is then pulled and the machine is ready for the next series of numbers to be added. The depression of the number "1" multiplier key causes the same number indicated by depressed keys 72 to be set up on the total numeral wheels 2. To clear the machine for the next operation, the clearing handle is operated. After adding, if the next operation is to be one of multiplication, the key 146 is pulled up.

Figure 18:
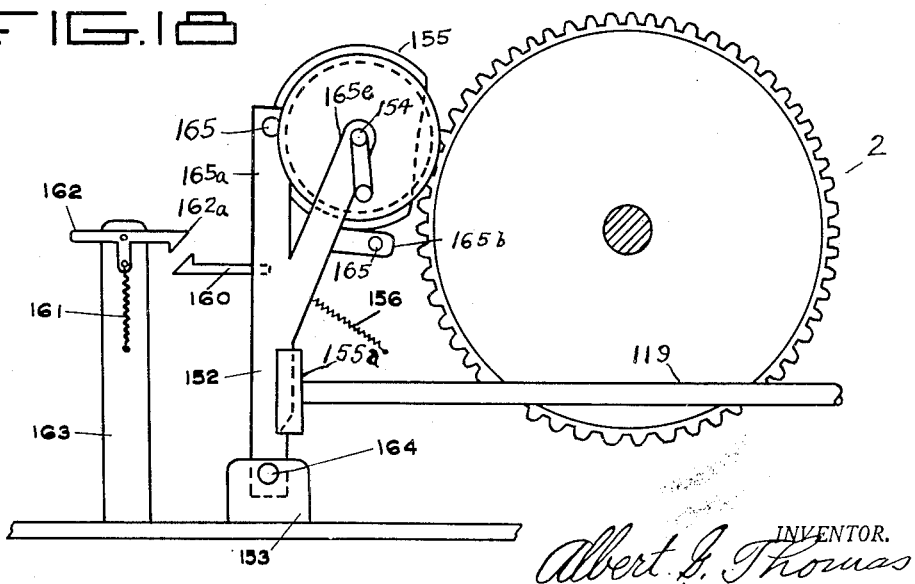

Referring now to Figs. 17 and 18, the machine may be equipped with the special adding mechanism illustrated. This mechanism is designed to add the results of any desired number of multiplications, such, for example, as the items of an invoice. That is to say, the individual items are multiplied, and after the last multiplication is performed, as already described, the total sum can be obtained by the mechanism of Figs. 17 and 18.

For this purpose the wheels 2 (already shown in Fig. 1) are provided with thin rim gears 150 attached firmly to their peripheries and which mesh with similar gears 148 freely rotatable on shaft 154, which in turn is rotatable in end bearings 152. The numeral wheels 149 adjacent gears 148 are also freely rotatable on shaft 154 and have their peripheries divided into ten equal number areas running from 0 to 9 inclusive, as shown. Rachet connections between gears 148 and wheels 149 are provided so that the necessary spaces or areas on wheels 149 will be carried over even though gears 148 are in mesh with gears 150. Since the wheels 149 rotate oppositely to the direction of rotation of wheels 2, the carryover mechanism will operate in the opposite direction from that already described. This carryover is constructed as previously described. The pins 159 on the annular rim portions of wheels 149 strike cams 157 on plates or discs 155 which are attached to sleeves 158 slidable on parallel rods 165 fastened to arms 165a and 165b of forked element 152. Spring 165c normally yieldingly hold sleeves 158 against stop pins 165d.

Shaft 154, having attached handle 154a, has rotary bearing in arms 165e and carries arms 151 adapted to strike pins 159 and to return wheels 149 to zero or starting position when handle 154a is turned. Wheels 149 are constructed with outer numeral rims rotatable on inner discs, with face notches in the rim, as previously described for wheels 2. The carry-over mechanism as indicated in Figure 17 is of similar construction as before. Wheels 2, as shown in the latter figure, would, however, be rotated in a direction opposite to that previously described, or the numerals on wheels 149 should be in reverse order.

Hook 160 (Fig. 18) is attached to element 152 and will be engaged by latch 162a pivoted to post 163, when forked element 152 is sufficiently rotated counterclockwise about pivot 164 on foot 153. Tension spring 161 normally holds latch 162a in position to catch and hold hook 160. Abutment cam 155a, attached to extended clearing shaft 119, may be rotated to force forked element 152 counterclockwise so that gears 148 will be brought out of mesh with gears 150 while wheels 2 are being returned to zero position by the clearing mechanism. In this way, the totalizer wheels 49 preserve their readings until cleared. When wheels 49 are not in use, element 152 is pushed back so that latch 162a holds hook 160 and so keeps gears 148 and 150 out of engagement. When it is desired to use the totalizer wheels 49, lever 162 is depressed so that latch 162a releases catch 160 and spring 156 then pulls element 152 over so that gears 148 engage gears 150 on wheels 2. Cam 155a, when rotated, moves element 152 enough to disengage gears 148 and 150 but not sufficiently to cause latch 162a to hold hook 160.

The general theory of operation of the present machine is as follows. Instead of operating a multiplier handle or key the same number of times as the number of the multiplier digit, as has been the custom with some machines, gear ratios are employed so that depression of the "9" multiplier key, for example, will rotate the total numeral wheels 2 through nine times as many unit divisions as would be the case when the number "1" multiplier key is depressed. Similarly, depression of the number "5" multiplier key one time causes the total numeral wheels 2 to rotate through five times as many spaces as when the number "1" key is depressed, and a corresponding effect is produced by depression of any of the other numeral keys. When the zero multiplier key is depressed, the carriage is simply shifted one space to the left.

By means of the curved plate 44, rack 49 and gear 50, the shaft 51 and keys 72 are rotated through exactly the same angle every time a multiplier key of any numerical value is depressed its full distance. The zero keys 72 are so located that lever arms 14, and consequently clutches 9, are released at the instant any multiplier rack 38 touches its cooperating gear 36, with the result that the number "9" keys 72 will be in such position that clutches 9 are released at the instant that numeral wheels 2 show the reading "9" after the number "1" multiplier key has been depressed. Evidently, then, if the number "3" multiplier key, for example, is depressed, the numeral wheels 2 will rotate through 3×9 or 27 unit spaces, since the gear ration between the number "3" rack and its cooperating gear 36 is three times the ratio for the number "1" key, whereas the ratio between rack 49 and gear 50 always remains the same. In other words, the reading of any numeral wheel 2 is proportionate to the reading of the multiplier key which is depressed, assuming that the same multiplicand key is kept depressed. If instead of allowing the number "9" multiplicand key to strike trigger arm 16, the number "3" multiplicand key is depressed, then this particular numeral wheel 2 will rotate through only one-third as many spaces as it did in the previous example before its clutch 9 will be released. The reading will then be 3×3 or "9," which is one-third of the previous product "27." Thus it will be evident that the reading of any numeral wheel 2 when it has been disconnected from its clutch and remains stationary, except for the carry-over, is proportional to the numerical value of the depressed multiplicand key in register with it and is also proportional to the numerical value of the multiplier key which is depressed. The reading on numeral wheel 2 is therefore proportional to the product of the numerical value of the two depressed keys. The product of each digit of the multiplicand by each digit of the multiplier is therefore registered on the proper wheels 2 and these products are automatically added by means of the clutch devices, the carry-over system and the automatically shifted carriage.

Figures 20, 21:
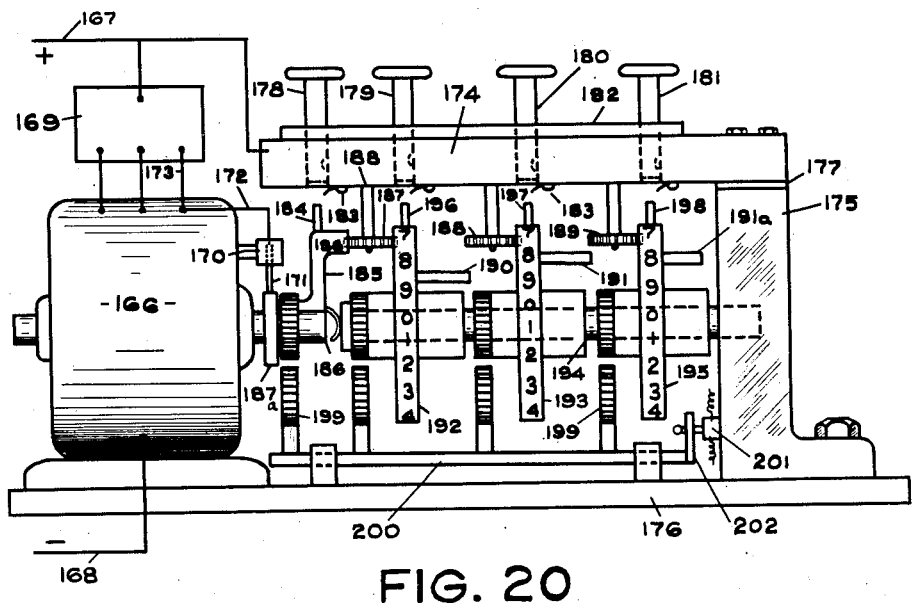
Fig. 20 is a front elevation of an electrical calculator or similar device, employing a step motor.
Fig. 21 is a front elevation of a modified electrical calculator or similar device, using a step motor.

In Figure 20 motor 166 is of the type described in my co-pending applications, Serial No. 598,502, filed June 9, 1945, and Serial No. 671,204, filed May 21, 1946. This motor can be operated in steps of predetermined angular displacement. It is supplied, preferably, with direct current from lines 167 and 168 which current is distributed to the three phased sections of the motor by means of commutator or distributor 169 the details of which are described in the above applications.

Brush holder 170 is fastened to motor 166 and carries brush 171 which is electrically connected with one of the field sections by means of conductor 172 which leads to conductor 173 connected to a field section. Line 167 is connected with metal bar 174 bolted to post 175 which is bolted to base plate 176. Mico or other insulation 177 is placed between bar 174 and post 175 and the bolts are insulated so that bar 174 is not electrically connected with post 175.

Keys 178, 179, 180, and 181 are vertically slidable in slots in bar 174 and plate 182 which may be lifted by the clearing mechanism (not shown) to return any or all keys to the normal positions shown where they are supported by detents 183. These detents also act to hold the keys in depressed positions, by pressing into suitable notches in the keys. The key buttons are of insulating material and the keys may be insulated in any way desired.

Contact pin 184 is carried on arm 185 fastened to the motor shaft 186 which also carries slip ring 187a against which brush 171 is pressed by a spring. Arm 185 has pawl 186 adapted to strike toothed wheel 187 which is pivoted to post 188 extending from bar 174 so that wheel 187 can be rotated in a horizontal plane. Similar wheels 188 and 189 are similarly mounted and are adapted to be struck by pawls or arms 190 and 191, respectively, extending from the faces of discs 192 and 193 which are fastened to hubs having rotary bearing on shaft 194 extending from post 175. Similar disc 195 is rotatable on shaft 194 and may be rotated in steps by gear or toothed wheel 189 which is meshed with circular teeth cut in the left face of disc 195. By means of similar teeth cut in the left faces of discs 192 and 193, these discs may be rotated in equal steps by means of meshed, toothed wheels or gears 187 and 188, respectively. Discs 192, 193, and 195 carry respective contact pins 196, 197 and 198 aligned to strike the respective associated keys 179, 180, and 181, when the keys are depressed. Contact pin 184 likewise may strike key 178 when that key is depressed. The keys may be of highly conductive material or may have attached contacts to be struck by the contacts on the electrically conductive discs. Any suitable clearing mechanism, similar to that previously shown or of other design, may be used to set the motor and discs to zero or starting position. This clearing mechanism may comprise rotatable arcuate gears 199 mounted on shaft 200 which is rotatable in suitable bearings to engage aligned gears on the motor shaft and the hubs of discs 192, 193 and 195. There are ratchet connections between the gears and the shaft and hubs or between the hubs and discs. Suitable stops are provided or clearing arms can strike arms 185, 190, 191, and 191a for aligning purposes.

In operation, if it is desired that motor 166 revolve through a predetermined number of revolutions or steps and then stop, the "one" key 178 will be depressed for one revolution, for instance. Then, motor 166 will be energized, as described in the previous applications, to rotate through one revolution in steps. When contact 184 is rotated through a full revolution, or through a definite number of steps, depending upon the starting position of contact 184, this contact will strike depressed key 178 to close the circuit including line 167, bar 174, key 178, contact 184, arm 185, slip ring 187, brush 171, conductor 172, one field section, and line 168. When this one field section is energized the rotor of the motor is locked in position.

If a greater number of revolutions of the motor is desired, then key 179 will be depressed and gear or toothed wheel 187 will be moved through one angular tooth width for each revolution of the motor and pawl 186. After a predetermined number of revolutions of the motor, depending upon the number of teeth in wheel 187 and the number of associated teeth in the face gear of disc 192, contact 196 will be rotated to strike key 179 and so to close the circuit to the field section connected with conductor 172. This causes the rotor to stop revolving immediately due to the peculiar construction of the motor which also acts as a magnetic brake. Electrical connection with any disc and slip ring 187a is maintained by a flexible brush connecting the motor shaft with shaft 194, or other connections may be used. Slip ring 187a is electrically connected with the shaft of the motor.

Similarly, progressively higher numbers of revolutions of the motor before stoppage can be obtained by pressing keys 180 or 181. The ratios of revolutions may be in tens or in other proportions. Any suitable ratios and any desired numbers of keys can be used, to cause the motor to revolve through any desired number of steps, or revolutions, before automatic cut-off occurs. This motor and system are therefore highly useful in calculating or computing machines, bookkeeping machines, and similar devices, since a predetermined number of movements of the rotor, in small angular steps or in revolutions as desired, may be automatically obtained merely by pressing one or more keys. The drawings are largely schematic and serve to illustrate general principles rather than details of construction which can be widely varied. The keys can conduct grid currents of tubes. Clearing bar 182 can be raised by any suitable mechanism to reset the keys to the positions shown. Toggle switch 201, fastened to post 175, is arranged so that it can be manually closed and so that it will be struck by arm 202 of shaft 200 and will therefore be opened when clearing shaft 200 is rotated through an angle. If switch 201 is connected in series with line 168, the motor will be started when switch 201 is closed and the current will be cut off when the clearing mechanism is operated.

The discs may have equally spaced numerals on their peripheries for adding or counting purposes. One or a plurality of sets of numerals may be used.

In Figure 21, motor 203 is similar to motor 166 but distributor 169 is omitted. Keys 204 are vertically slidable in slots in bar 205 which is suitably fastened to the framework 206 of the device, shown broken away. Compression springs 207 are placed around the key stems between the buttons and bar 205 and normally keep the keys in the positions shown. The keys are limited in upward movement by attached pins 208 striking the under side of bar 205. The keys vary progressively in length according to geometrical or any other desired ratio.

Bar 209, having integral legs 210 and 211 at right angles, is placed beneath the keys and in alignment therewith. Leg 211 is vertically slidable in a slot 212 in post 213 attached to base 214, and leg 210 is vertically slidable in an edge slot or groove 215 in post 216 attached to the base. Compression spring 217 is fastened to the upper end of post 216 and to bar 209 and normally supports this bar in the position shown against a suitable stop or against the lower ends of keys 204, as desired. A similar spring can be used for the other end of the bar.

Leg 210 is of metal and has a slotted edge forming teeth 218 the spaces between which are preferably filled with insulating material such as Bakelite. Three brushes 219 are mounted in insulating block 220 fastened to the motor. Conductors 221 electrically connect the brushes with the three motor section windings. Line 222 is flexibly connected with leg 210 and the other line 223 is connected with the junction of the three motor windings. Teeth 218 normally extend downward to a position slightly above the uppermost brush 219 so that no contact with the brush is made. The strip 224 is of insulating material.

Disc 225, with concentric depressions or dimples 226 in a face thereof, is fixed to the motor shaft. There should preferably be one depression for each rotor step. Detent 227 is fastened to the motor and is aligned so that it will fall into any one of the depressions when the rotor teeth of the motor are at predetermined position relative to the stator teeth, which position may be with the rotor teeth near their maximum forward swing for any one step. Shaft 228 has rotary bearing in post 229 fastened to base 214 and is aligned with the shaft of the motor. Shaft 228 carries disc 230 coaxially therewith and this disc carries ratchet 231 which is adapted to engage concentrically arranged notches in the left face of disc 225. These notches preferably coincide in angular and radial position with depressions 226.

If desired, the keys 204a may be horizontally slidable in slots in leg 211 and the right edge of post 213 may have a vertical slot of sufficient width to allow passage of the keys while in the positions shown. If, however, a key is pressed so that it projects to the left of leg 211, then that key will strike the left top edge of post 213 to stop downward movement of bar 209 at the chosen position. In order to reset the keys to starting or zero position, cam bar 232 is moved to the right through bearing post 233 so that any key or keys projecting will be pushed back to zero position when spring 217 returns bar 209 and integral legs to the uppermost position.

In operation, when it is desired to rotate the shaft of the motor through the minimum number of steps, the shortest key 204 will be depressed its full travel so that bar 209 and consequently teeth 218 will be moved downward. As each tooth passes the three brushes the rotor will be moved through three steps since the three windings will be energized in sequence. If it is desired that the rotor move through only one step the shortest key will be of such length that the bottom tooth 218 moves downward only enough to touch the first brush 219. If two steps of movement of the rotor are desired then the bottom tooth 218 should touch only the first two brushes 219. The teeth should be separated sufficiently so that only one tooth touches a brush at any one instant, unless reverse braking is desired, as described in one of the above applications.

If the maximum step displacement of the rotor is desired, the longest key will be depressed and the intermediate keys will be depressed for intermediate displacements. The number of steps displacements for the keys can be in the ratios of tens, hundreds, etc., as in usual calculating machines of other type or other ratios can be chosen. As the rotor is moved in steps, detent 227 being resiliently urged into a depression 226 will insure proper alignment to produce a definite numeral alignment with a window, for a calculating machine.

By means of ratchet 231 shaft 228 is rotated in forward direction in similar steps and detent 234, attached to post 229, may be used in connection with depressions in a face of disc 230 to align that disc properly in steps. The ratchet allows shaft 228 to remain in position when the rotor of motor 203 is moved in steps in reverse direction as teeth 218 sweep upward past brushes 219, after release of a key, due to action of spring 217. If it is desired that the rotor do not reverse as teeth 218 are lifted to starting position, these teeth or brushes 219 can be automatically displaced by means of a rocker and cam, or otherwise, so that no contact is made during return.

Shaft 228 can be substituted for shaft 5 or a similar shaft to drive a plurality of numeral wheels. In numerous applications including calculating machines, bookkeeping machines, tabulators of various kinds, analyzers, totalizers, and sequence devices, it is desirable or essential that a shaft or shafts be rotated through a determinate number of steps or revolutions. The motors and controls shown in Figures 20 and 21 are very advantageous for the purposes mentioned, and for other uses, since the shaft can be rotated through predetermined angles and can be stopped at desired positions. By this means, also, the motor can be operated at relatively low speeds so that clutches and other mechanism can often be eliminated.

Figure 22:
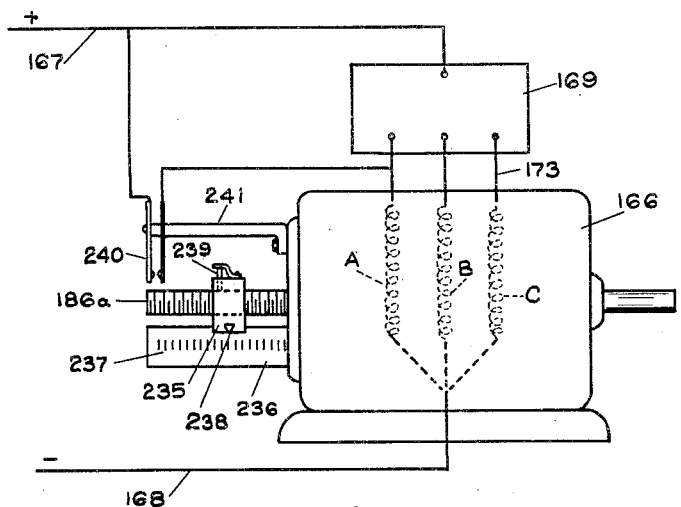
Fig. 22 is a front elevation of a step motor with automatic counter or stopping mechanism, for use with calculators and for other purposes.

In Figure 22, motor 166 and distributor 169 can be of the same construction as described in connection with the device shown in Figure 20, and can be connected with lines 167 and 168 in the same manner. The three section windings for magnetizing the rotor or stator teeth, or both, are indicated at A, B, and C. The motor shaft 166a is threaded and has surrounding threaded collar 235 which is slotted to slide along bar 236 attached to the motor. This bar has scale 237 relative to which index 238 on collar 235 can be set by lifting spring-pressed pin 239 in a hole in the collar so the latter can be slipped along shaft 166a. Pin 239 normally engages the threads of shaft 166a so that collar 235 will be moved toward normally open resilient contacts 240 mounted on insulating arm 241 attached to the motor. One contact 240 is connected with line 167 and the other with the inlet terminal of winding A.

In operation, index 238 is set relative to the scale on bar 236 to indicate the number of revolutions or steps through which it is desired that the rotor move before stopping. The motor is then started by energizing lines 167 and 168 and the motor moves in steps until threaded shaft 166a moves block or slide 235 to the left so that it forces the contacts 240 together. Winding A then becomes continuously energized so that the rotor is magnetically locked against further movement. When it is desired to reset block 235, pin 239 is pulled up and the block is moved to the position desired. This motor can be used for purposes described.

Figure 23:
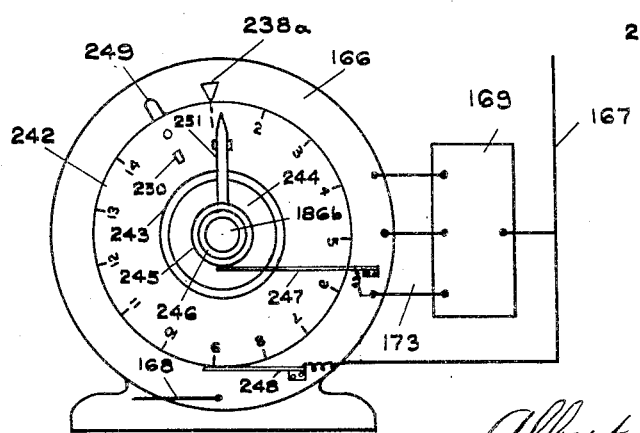
Fig. 23 is an end elevation of a step motor with automatic counting or stopping device.

A modification of the motor control of Figure 22 is shown in Figure 23. Metal disc 242 has attached bearing sleeve 243 which is rotatable on annulus 244 of insulating material, attached to motor 166. Like numerals indicate like parts as in Figure 22. Slip ring 245 is fastened around insulating sleeve 246 which is fastened around motor shaft 166b. Resilient brush 247 engages slip ring 245 and is supported on an insulating block fastened to the machine. Similar brush 248 is connected with line 167. Handle 249 is attached to the rear face of disc 242. Contact 250 is attached to disc 242 and is positioned to be struck by contact arm 251 attached to the rear edge of ring 245.

In operation, disc 242 is rotated by handle 249 until a numeral on the circular scale on the disc is in register with index 238a on the motor. Then the motor shaft will be rotated in steps, in counterclockwise direction, say, after being energized. When contact arm 251 strikes contact 250, the circuit from line 167 through one of the windings is completed, as before, to lock the rotor. Disc 242 and attached contact 250 may be rotated to any desired position to determine the number of steps through which the rotor will be revolved before stopping.

Figure 24:
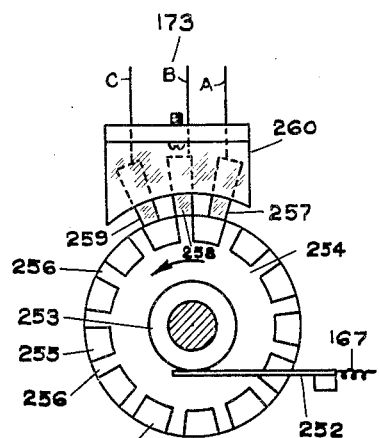
Fig. 24 is a fragmentary end view, a commutator and brushes, for use with a step motor.

Figure 24 shows one form of distributor which may comprise the unit 169. Line 167 is connected with resilient brush 252 pressing against slip ring 253 integral with metal disc 254 which has peripheral inserts 255 of insulating material such as Bakelite. Therefore, as metal teeth 256 are rotated beneath brushes 257, 258, and 259, mounted in insulating block 260, the current will be distributed to the conductors 213 in proper order to cause rotation of the motor as described in the above mentioned applications. The teeth 256 can be separated so that only one tooth will be in contact with a brush at any one time, or they can be more closely spaced, as shown, so that braking effect in certain windings will occur at proper times, in order to prevent oscillations of the rotor.

While I have shown and described modifications of my computing or calculating machine and associated devices, it is obvious that numerous changes of detail and variations can be made without departing from the broad principles of the invention.

What I claim is:

1. A calculating machine including computing mechanism comprising a plurality of numeral wheels, a numeral wheel shaft on which said wheels are mounted, a gear carrying shaft geared to said numeral wheel shaft, said gear carrying shaft having thereon a series of gears the diameters of which increase in one direction in geometrical ratio, and a depressible multiplier key controlling each gear of said series.

2. A calculating machine including computing mechanism comprising a plurality of numeral wheels, a numeral wheel shaft on which said wheels are mounted, a gear carrying shaft geared to said numeral wheel shaft, said gear carrying shaft having fixed thereon a series of gears the diameters of which increase in one direction in geometrical ratio, and a depressible multiplier key with a rack bar attached thereto for meshing with and controlling each gear of said series.

3. A calculating machine including a plurality of numeral wheels, a plurality of multiplier keys, a rack bar associated therewith, a multiplicand key shaft carrying a gear in mesh with said rack bar, a plurality of groups of multiplicand keys associated with said multiplicand key shaft, said shaft being rotated through said gear and rack bar through the same predetermined angle on each depression of any multiplier key.

4. A calculating machine including a plurality of numeral wheels, a plurality of reciprocating multiplier keys controlling said wheels, a plurality of multiplicand keys, a multiplicand key shaft carrying said keys and rotatably and axially movable, devices controlled by said multiplier keys for causing rotation of said multiplicand key shaft on depression of said multiplier keys, a releasing element actuated on the return stroke of any multiplier key at the moment it nears the end of such stroke to release said multiplicand key shaft for axial movement, and spring means for moving said shaft axially when so released.

5. A calculating machine including a plurality of numeral wheels, a plurality of reciprocating multiplier keys controlling said wheels, a plurality of multiplicand keys, a multiplicand key shaft carrying said keys and rotatably and axially movable, devices including a rack controlled by said multiplier keys and a gear meshed therewith and slidable on said multiplicand key shaft for causing rotation of said shaft on depression of said multiplier keys, said shaft having a plurality of peripheral grooves therein, and a releasing element cooperating successively with said grooves and released on the return stroke of any multiplier key at the moment it nears the end of such stroke to release said multiplicand key shaft for axial movement, and spring means for moving said shaft axially when so released, thereby bringing the next groove in said shaft into holding engagement with said releasing device.

6. A calculating machine including a plurality of numeral wheels, clutches cooperating therewith, a lever arm controlling each clutch, a releasable trigger for holding each lever arm in predetermined position, a series of rotary sectors each carrying a plurality of depressible multiplicand keys, one of said triggers being released by a depressed multiplicand key when its sector is rotated, and spring means acting on each lever arm and operable on release of its trigger to move the corresponding clutch out of engagement with its numeral wheel.

7. A calculating machine including a plurality of numeral wheels and a plurality of sectors each carrying depressible multiplicand keys including zero keys, triggers actuated by said multiplicand keys for controlling said numeral wheels, said triggers being actuated by said keys, a clearing mechanism shaft and devices operated thereby for releasing all depressed multiplicand keys, except said zero keys, to clear said triggers but depressing all undepressed zero keys into position to actuate said triggers.

8. A calculating machine including a plurality of numeral wheels and a plurality of sectors each carrying depressible multiplicand keys including zero keys, triggers actuated by said multiplicand keys for controlling said numeral wheels, said triggers being actuated by said keys, a clearing mechanism shaft, devices operated thereby for releasing all depressed multiplicand keys, except said zero keys, to clear said triggers but depressing all undepressed zero keys into position to actuate said triggers, and devices on each sector for releasing any depressed zero key on that sector when any other multiplicand key on that sector is depressed.

9. A calculating machine including a plurality of numeral wheels, a plurality of reciprocating depressible multiplier keys controlling said wheels, a plurality of multiplicand keys also controlling said wheels, a multiplicand key shaft carrying said multiplicand keys and rotatably and axially movable, devices controlled by said multiplier keys for causing rotation of said multiplicand key shaft on depression of said multiplier keys, a releasing element actuated on the return stroke of any multiplier key to release said multiplicand key shaft for axial movement, spring means for moving said shaft axially when so released, and clearing mechanism including a sliding member for returning said shaft in an axial direction to its initial position.

10. A calculating machine including a plurality of numeral wheels, clutches cooperating therewith, a lever arm controlling each clutch, a releasable trigger for holding each lever arm in predetermined position, a series of rotary sectors each carrying a plurality of depressible multiplicand keys, one of said triggers being released by a depressed multiplicand key when its sector is rotated, spring means acting on each lever arm and operable on release of its trigger to move the corresponding clutch out of engagement with its numeral wheel, a spring controlled reciprocator for returning released lever arms to their initial positions, and clearing mechanism including a slide for moving said reciprocator in lever-arm-returning direction.

11. A calculating machine including a plurality of numeral wheels, clutches cooperating therewith, a lever arm controlling each clutch, a releasable trigger for holding each lever arm in predetermined position, a lever arm resetting shaft mounted for rotatable and axial movement, a plurality of resetting pins carried thereby, a multiplicand key shaft, a series of rotary sectors thereon each carrying a plurality of multiplicand keys, a plurality of depressible multiplier keys, a link connection between said shafts to cause them to rotate together, devices connecting said multiplier keys with said multiplicand key shaft for causing rotatable and axial movement of said shaft each time one of said multiplier keys is depressed, said resetting shaft moving with said multiplicand key shaft in position to reset one lever arm less upon each depression of a multiplier key.

12. A calculating machine including a plurality of numeral wheels, clutches cooperating therewith, a lever arm controlling each clutch, a releasable trigger for holding each lever arm in predetermined position, a rotatable and axially movable multiplicand key shaft, a plurality of rotary sectors thereon each carrying a series of multiplicand keys, one of said triggers being released by a depressed multiplicand key when its sector is rotated, spring means acting on each lever arm upon release of its trigger to move the corresponding clutch out of engagement with its numeral wheel, a lever arm resetting shaft carrying a plurality of resetting pins cooperable with said lever arms, a plurality of depressible multiplier keys, spring means for moving said multiplicand key shaft axially when one of said multiplier keys is depressed, a clearing handle and clearing shaft connected thereto and to said resetting shaft and operable to move said shaft to reset said lever arms upon actuation of said clearing handle, and a shaft-returning slide actuated by said clearing shaft and also operable upon actuation of said clearing handle to return said multiplicand key shaft to its original position simultaneously with the resetting movement of said resetting shaft.

13. A calculating machine including a plurality of numeral wheels, a plurality of series of arcuately movable and depressible multiplicand keys associated therewith, a series of rectilinearly movable depressible multiplier keys operatively associated with said multiplicand keys and with said numeral wheels, and safety devices associated with said multiplier keys insuring the depression of each through its predetermined full stroke before it is returnable to its starting position.

14. A calculating machine including a plurality of numeral wheels, a plurality of series of arcuately movable and depressible multiplicand keys associated therewith, a rotatable and axially movable shaft carrying said keys, a series of rectilinearly movable depressible multiplier keys operatively associated with said multiplicand keys and with said numeral wheels, a depressible adding key, a multiplicand key controlling bar brought into operative adding position by said key, and a locking device preventing axial movement of said multiplicand key shaft when said adding key is depressed, while permitting its rotation.

15. A calculating machine including a plurality of numeral wheels, a clutch associated with each, a lever controlling each clutch, a plurality of multiplicand keys operatively associated with said numeral wheels, a series of multiplier keys controlling said wheels and said multiplicand keys, an auxiliary numeral wheel shaft, pivoted brackets carrying said shaft, a plurality of auxiliary numeral wheels carried by said auxiliary numeral wheel shaft, devices for holding said auxiliary numeral wheels in operative engagement with said first mentioned numeral wheels, and a locking element operable to hold said auxiliary numeral wheels out of such engagement.

16. A calculating machine including a plurality of numeral wheels, a plurality of multiplier keys, a shaft actuator operatively connected therewith, a multiplicand key shaft actuated thereby, a plurality of groups of multiplicand keys associated with said multiplicand key shaft, said shaft being rotated by said shaft actuator through the same predetermined angle on each depression of any multiplier key.

ALBERT G. THOMAS.

REFERENCES CITED

The following references are of record in the file of this patent:

UNITED STATES PATENTS

| Number | Name | Date |
|---|---|---|
| 923,981 | Mason | June 8, 1909 |
| 1,064,451 | De Forest | June 10, 1913 |
| 1,119,967 | Landsiedel | Dec. 8, 1914 |
| 1,260,061 | Rosenthal | Mar. 19, 1918 |
| 1,518,173 | Bacon | Dec. 9, 1924 |
| 1,527,407 | Harmsen | Feb. 24, 1925 |
| 2,111,996 | Slye | Mar. 22, 1938 |